Aug. 31, 1965  C. P. HALLEZ  3,203,140
CUTTING DISC WITH DIAMONDED SEGMENTS
Filed Feb. 14, 1963
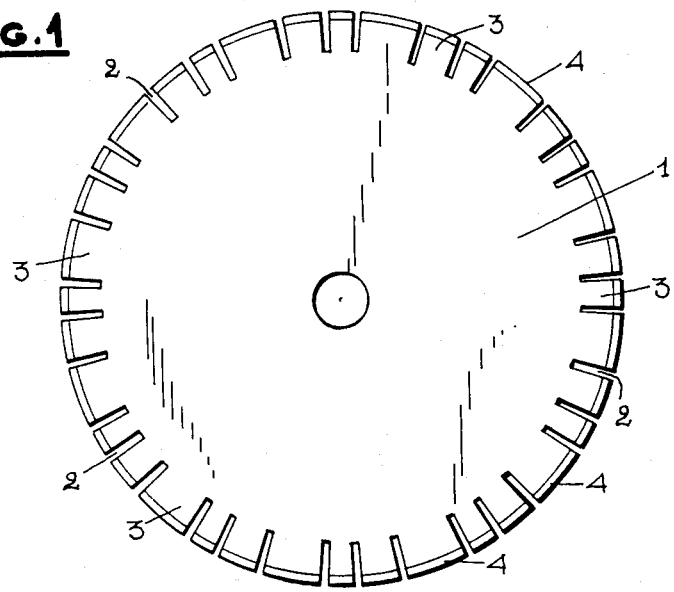
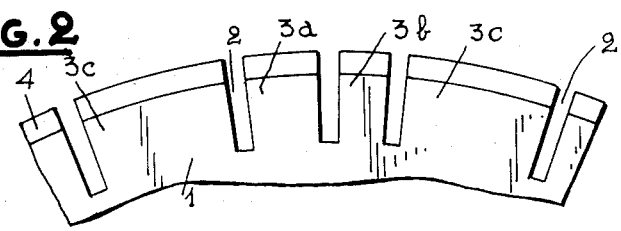
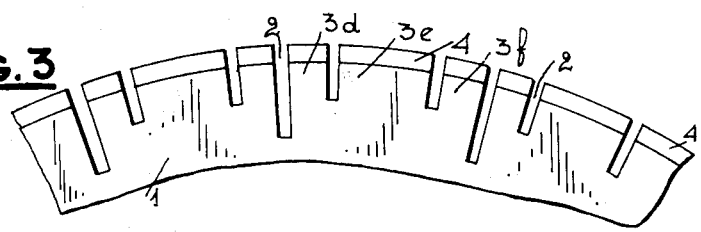
INVENTOR
CHARLES PIERRE HALLEZ
By Irwin S. Thompson
ATTY.

United States Patent Office 3,203,140
Patented Aug. 31, 1965

3,203,140
CUTTING DISC WITH DIAMONDED SEGMENTS
Charles Pierre Hallez, Forest, Belgium, assignor to Diamant Boart, Forest, Brussels, Belgium
Filed Feb. 14, 1963, Ser. No. 258,550
Claims priority, application Belgium, Feb. 22, 1962, 614,239
5 Claims. (Cl. 51—206)

This invention relates to cutting discs, and in particular to circular cutting discs wherein the peripheral edge thereof is provided with a plurality of radially extending slots defining a plurality of cutting teeth each of which is provided at its peripheral edge with a diamond-tipped segment.

In known cutting discs of this type, the teeth supporting the diamond-tipped segments are distributed equally around the periphery of the disc, with respect to the axis thereof, and are of equal circumferential or peripheral length with the radial slots therebetween.

In certain instances, these known types of discs suffer from the disadvantage of excessive, rapid and uneven wear which terminates in the cutting teeth being worn into the shape of a point rather than an arc of large radius which is, obviously, more desirable.

This particular wear of the teeth and of the diamond-tipped segments can be attributed to the fact that, at certain operating speeds of the cutting disc determined by the nature of the material to be cut, a common resonance is attained between the frequency of the passage of the teeth at the cutting point, and the natural frequency of the teeth bending in the direction of the axis of the disc. The object of the present invention, therefore, is to provide a cutting disc whereby a common resonance of the two abovementioned frequencies is averted.

According to its broadest aspect, the present invention relates to a cutting disc provided with a plurality of radial slots along its periphery and defining a plurality of circumferential cutting teeth each of which is provided along its peripheral edge with a diamond-tipped segment, the improvement being characterized by the fact that at least one tooth has a length which is different than at least one of the two lengths of the two adjacent teeth.

Further special features and details of the invention will be disclosed in the description of the drawings accompanying the present specification, which said drawings show diagrammatically and purely by way of example two embodiments of the drill head according to the invention.

FIGURE 1 is a front elevation of one embodiment of a cutting disc constructed according to the present invention, FIGURE 2 is a view of a portion of the disc illustrated in FIGURE 1, on an enlarged scale, FIGURE 3 is a view similar to that of FIGURE 2, of an alternate embodiment of the invention.

Referring now to FIGURE 1, a cutting disc indicated generally at 1 is provided with a central bore, whereby the disc is capable of being mounted on a rotatable shaft (not shown). The disc 1 is also provided with a plurality of radial slots each indicated generally at 2, in its peripheral edge, defining a plurality of circumferential cutting teeth each indicated generally at 3 each of which is provided, along its peripheral edge, with a diamond-tipped segment 4. The slots 2 and teeth 3 are of the same radial depth and height, respectively, and as shown in FIGURE 2, the slots 2 are formed in a manner defining sequential groups of teeth each group comprising three successive teeth such, for example, as teeth 3a, 3b and 3c each having a circumferential length different from at least one adjacent tooth of its associated group.

In a second embodiment of the invention, illustrated in FIGURE 3, the teeth form groups of three successive teeth 3d, 3e and 3f. In each group, the teeth 3d and 3f have the same circumferential length while the tooth 3e is longer than the two others. Furthermore, the slots delimiting the tooth 3e have the same depth while the slot situated between the teeth 3d and 3f is deeper than the first-mentioned slots.

It will be appreciated that, in all embodiments shown in the drawing and described above, the spirit of the invention is unchanged in that each embodiment prevents the frequency of the passage of the teeth at the cutting point and the natural frequency of the teeth bending in the direction of the axis of the disc from attaining a common resonance.

It will be further appreciated that the sequential groups described above may comprise a greater number of cutting teeth and radial slots to eliminate the common resonance of the said frequencies.

What I claim is:

1. A cutting disc provided, along its periphery, with a plurality of radial slots defining a plurality of circumferential cutting teeth provided with diamond-tipped segments, at least one of said teeth having a circumferential length which is different than at least one of the circumferential lengths of the adjacent teeth.

2. A cutting disc provided, along its periphery, with a plurality of radial slots having equal depths and defining a plurality of circumferential cutting teeth provided with diamond-tipped segments, at least one of said teeth having a circumferential length which is different than at least one of the circumferential lengths of the adjacent teeth.

3. A cutting disc provided, along its periphery, with a plurality of radial slots defining a plurality of circumferential cutting teeth provided with diamond-tipped segments, at least one of said slots having a depth which is different than that of the other slots, and at least one of said teeth having a circumferential length which is different than at least one of the circumferential lengths of the adjacent teeth.

4. A cutting disc provided, along its periphery, with a plurality of radial slots having equal depths and defining a plurality of circumferential cutting teeth provided with diamond-tipped segments, each tooth having a circumferential length different than at least one of the circumferential lengths of the adjacent teeth.

5. A cutting disc provided, along its periphery, with a plurality of radial slots defining a plurality of circumferential cutting teeth provided with diamond-tipped segments, each slot having a depth different than at least one of the depths of the adjacent slots and each tooth having a circumferential length different than at least one of the circumferential lengths of the adjacent teeth.

References Cited by the Examiner

UNITED STATES PATENTS

| 1,979,905 | 11/34 | Rogerson | 51—206.4 |
| 2,749,681 | 6/56 | Reidenbach | 51—209 |
| 2,822,648 | 2/58 | Metzger et al. | 51—206 |

FOREIGN PATENTS 866,588   8/41   France.

ROBERT C. RIORDON, Primary Examiner.

LESTER M. SWINGLE, Examiner.